Jan. 30, 1962

F. C. GUIDA 3,019,330

ELECTRODE FOR INERT GAS SHIELDED
ELECTRIC WELDING AND CUTTING

Filed Oct. 19, 1960

INVENTOR.
FRANK GUIDA

BY Morse & Altman

ATTORNEY

United States Patent Office 3,019,330
Patented Jan. 30, 1962

3,019,330
ELECTRODE FOR INERT GAS SHIELDED ELECTRIC WELDING AND CUTTING
Frank C. Guida, 144 Harryel Ave., Pittsfield, Mass.
Filed Oct. 19, 1960, Ser. No. 63,535
6 Claims. (Cl. 219—145)

This invention relates to improvement in electrodes for electric welding in cases where it is important to avoid oxidation of the weld. In such cases it is customary to provide a flow of inert gas, such as argon, at the weld to form a gaseous shield so as to keep oxygen from contact with the hot weld metal. It is an object of the present invention to supply such gas at the point of weld by flowing it through one or more bores surrounding the tip of the electrode. In this way a relatively small amount of the inert gas is used at the critical point to supply an adequate shield against oxidation. As inert gases are expensive, this results in a considerable economy in the use of gas for this purpose, since the flow can be small as it is concentrated exactly at the point where it is needed.

For a more complete understanding of the invention, reference may be had to the following description of an embodiment thereof and to the drawings, of which FIGURE 1 is a diagrammatic view of an electric welding circuit including an electrode embodying the invention;

Figure 1:
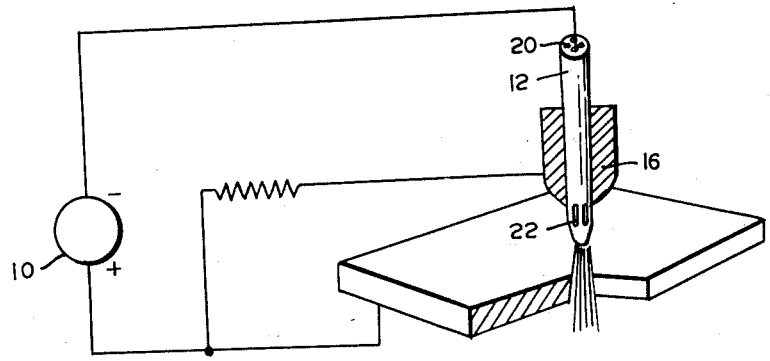

A conventional circuit for electric welding is shown in FIGURE 1, including a source 10 of electric current, the negative pole being connected to the electrode 12, the positive pole being connected to the work piece 14. The electrode 12 is preferably but not necessarily of the non-consumable type, e.g., tungsten, and is mounted in a torch a fragment 16 of the collet of which is indicated in FIGURE 1.

According to the invention, the electrode 12 is provided with a circular series of longitudinal bores 20 ending in orifices 22 opening out through the conical surface 24 of the tip of the electrode. The electrode 12 may be an integral rod as indicated in FIGURES 6 and 7, or may be a composite structure having a core 30 of tungsten or the like in a jacket 32 of a good conductor such as copper, the jacket having longitudinal bores 34, as indicated in FIGURES 2 and 3, for the transmission of inert gas to the welding point.

Figure 4:
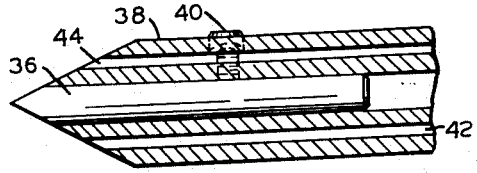
FIGURE 4 is a fragmentary sectional view of a modified form of electrode, the section being taken on line 4—4 of FIGURE 5.
Figure 5:
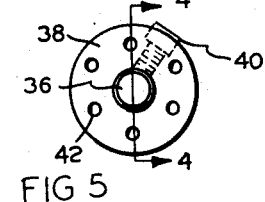
FIGURE 5 is an end elevation of the electrode shown in FIGURE 4.

An electrode with a removable core 36 within a jacket 38 is shown in FIGURES 4 and 5, the core being held in place by any suitable means such as a setscrew 40. The jacket 38 has a plurality of longitudinal bores 42 spaced around the core 36 with orifices 44 at the conical face on the tapered end of the electrode.

Figure 6:
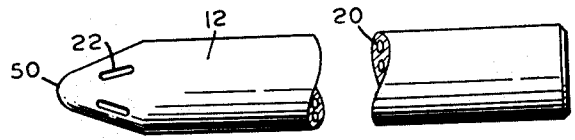
FIGURE 6 is a fragmentary side elevation of another modified form of electrode.
Figure 7:
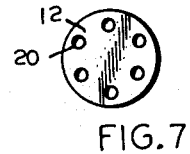
FIGURE 7 is an end elevation of the electrode shown in FIGURE 6.
Figure 8:
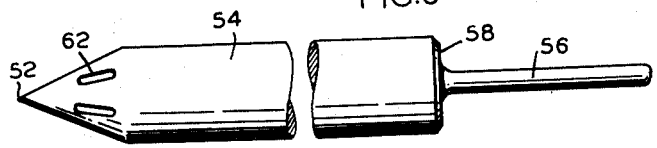
FIGURE 8 is a fragmentary side elevation of another modified form of electrode.
Figure 9:
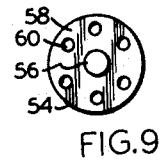
FIGURE 9 is an end elevation of the electrode shown in FIGURE 8.

The electrode 12 shown in FIGURES 6 and 7 may have a blunted tip 50 or a pointed tip as illustrated at 52 on the electrode 54 shown in FIGURES 8 and 9. The electrode 54 is a double-ended electrode, either end of which can be used to make a weld when the other end is secured in the torch handle. As shown, the end 52 is conically tapered. At the other end is an extension 56 of reduced diameter surrounded by a shoulder 58 through which open a series of bores 60. The bores have orifices 62 at the tapered end.

Figure 2:
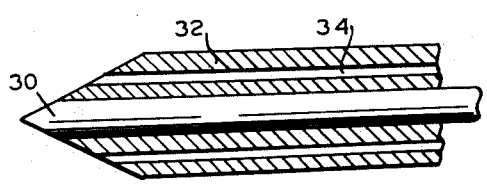
FIGURE 2 is a fragmentary sectional view of an electrode on an enlarged scale, on the line 2—2 of FIGURE 3.
Figure 3:
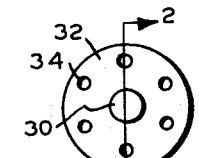
FIGURE 3 is an end elevation of the electrode shown in FIGURE 2.
Figure 10:
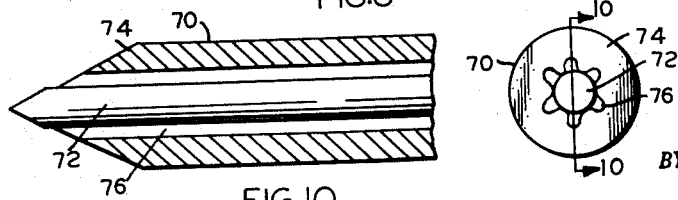
FIGURE 10 is a fragmentary sectional view of a modified form of electrode, the section being taken on the line 10—10 of FIGURE 11.
Figure 11:
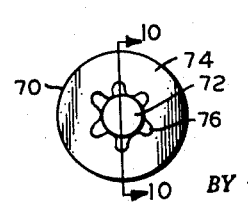
FIGURE 11 is an end view of the electrode shown in FIGURE 10.

The electrode 70 shown in FIGURES 10 and 11 is similar to that shown in FIGURES 2 and 3, having a core 72 of tungsten or the like fitted within a jacket 74 of a conductor such as copper. The jacket has longitudinal bores 76 laterally coniguous to the core 72. Such bores may conveniently be formed by a suitable broadening process.

The foregoing electrodes are described by way of illustration and not limitation, it being evident that other specific forms of electrode can be made within the scope of the invention as defined by the following claims.

I claim:

1. An electrode for electric welding, comprising a rod having an end portion of tungsten with a pointed tip, said rod having a circular series of longitudinal bores extending therethrough and opening at said end around said tip.

2. An electrode for electric welding, comprising a rod having at one end a tapered portion terminating in a pointed tungsten tip, said rod having a series of longitudinal bores therethrough terminating in orifices in the surface of said tapered portion around said tip.

3. An electrode for electric welding, comprising a rod having a tungsten core tapered at one end to a point, said rod having a circular series of longitudinal bores with orifices at said end near said point.

4. An electrode as described in claim 3, said rod including a copper jacket surrounding said core.

5. An electrode as described in claim 3, said rod including a jacket surrounding said core, said bores being in said jacket, said core being removably secured in said jacket.

6. An electrode for electric welding, comprising a rod the axial portion of which is of tungsten, said rod having one end portion tapered to a point, the other end portion being of substantially reduced diameter with a shoulder between it and the mid portion of the rod, said rod having a circular series of longitudinal bores opening at one end around said point and at the other end at said shoulder.

References Cited in the file of this patent

UNITED STATES PATENTS

| | | |
|---|---|---|
| 1,324,337 | Chapman et al. | Dec. 9, 1919 |
| 1,927,135 | Sammons | Sept. 19, 1933 |